March 4, 1969  G. M. HOCH  3,430,623
SELF-HEATING CONTAINER
Filed June 14, 1967
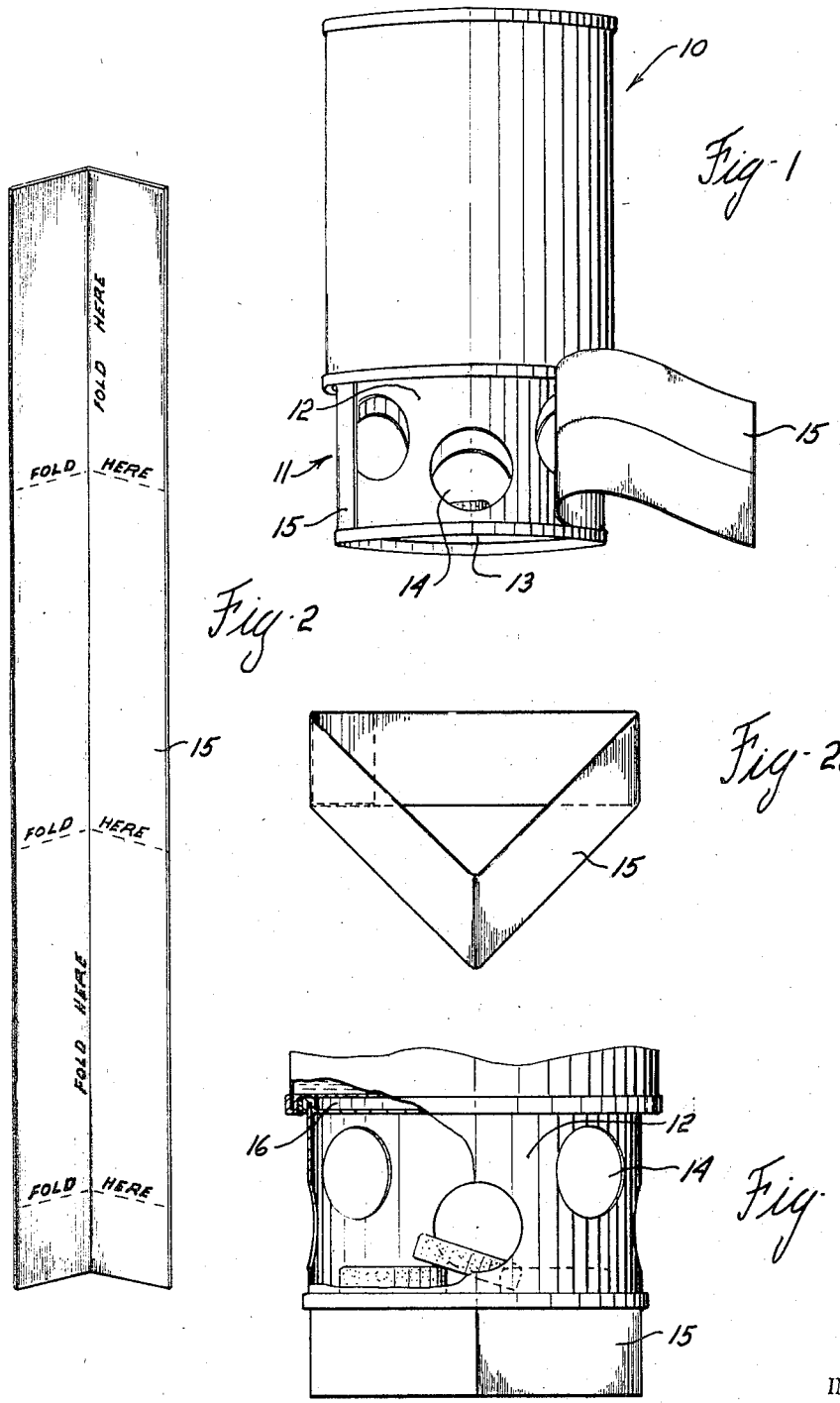
INVENTOR.
Glenn M. Hoch
BY
Synnestvedt & Lechner
ATTORNEYS

United States Patent Office 3,430,623
Patented Mar. 4, 1969

3,430,623
SELF-HEATING CONTAINER
Glenn M. Hoch, 1114 Apple Drive,
Mechanicsburg, Pa. 17055
Filed June 14, 1967, Ser. No. 646,097
U.S. Cl. 126—262     3 Claims
Int. Cl. A47g 23/04

ABSTRACT OF THE DISCLOSURE

A food container having an attached heating element for heating the contents of the container is disclosed. The heating element houses a charge of solidified fuel and is provided with a series of ventilating holes in its side walls. A removable sealing strip surrounds the side walls and covers the holes while the container is in storage. Score lines are printed on the sealing strip along which the strip is folded to form a tripod stand on which the bottom of the fuel container rests during heating of the contents of the food container.

---

This invention relates to a combination food container and heating device and more particularly to a self heating container especially well suited for convenient and safe heating of food where restaurant facilities or cooking equipment are not readily available. The invention is especially suited for use by hunters, campers, armed services personnel, office and shop workers or for anyone desirous of being able to prepare hot food with a minimum of inconvenience and bother.

Among the important features of the invention therefore, is the provision of a self heating food container which is extremely conpact and which can be used for providing individual servings of hot food for those without the usual cooking facilities.

An important object of the invention is the provision of a heating unit which can be attached to a conventional canned food container without modification of the can.

Another important feature of the invention is the provision of means associated with the container which prevents burning or scorching of the surface on which the container is placed.

Still another feature of the invention is the provision of a compact food container heating unit which can be stored and used without regard to effects of moisture, temperature or other adverse weather conditions.

Still another object of the invention is the provision of the food container heating unit which is simple and safe to operate.

The various objects of the invention are achieved by a canned food container having a fuel container attached thereto. A series of ventilating holes are formed in the sidewalls of the fuel container and a removable sealing strip surrounds the sidewalls and covers the holes while the container is in storage. The sealing strip is provided with score lines along which it is adapted to be folded to form a tripod stand on which the bottom of the fuel container rests for support purposes during the heating of the foods.

The various objects of the invention will be clearly understood upon reference to the following detailed description, when taken in light of the accompanying drawings in which:

FIGURE 1 is a perspective view of a container and heating unit formed in accordance with the principles of the invention;

FIGURE 2 shows the sealing strip removed from the sidewall of the heating unit and folded along one of the series of score lines;

FIGURE 2a shows the sealing strip folded to form a tripod stand in position to support the heating unit; and FIGURE 3 is an elevational view with portions of the structure being broken away for purposes of clarity to show the interior of the fuel container.

Turning now to the detailed description of the illustrative embodiment of the invention, a conventional can-like food container is illustrated in FIGURE 1. The container 10 preferably contains one of a variety of soups, stews, hashes or other foods or beverages which are ready to serve upon heating.

A cylindrical fuel contained 11 having sidewalls 12 and a bottom 13 is secured to the bottom of the food container. Means for securing the fuel container are provided, such as soldering, welding or an epoxy cement.

The fuel container may house one of a variety of solid or jellied fuels, generally fuels available in dry tablet form are preferred. Methenamine tablets ($C_6H_{12}N_4$) are excellent for the purpose. These tablets readily ignite when brought into contact with flame, burn with a smokeless flame, are practically odorless and leave practically no residue after combustion.

A series of circular ventilating holes 14 are formed in the wall 12. The holes are preferably large enough so that the fuel tablets can be lit with a match, yet not so large that they can drop out. The wall portions between the adjacent holes provide protection from wind in case the unit is being used out of doors or in other drafty locations.

A sealing strip 15 surrounds the wall portion 12 and isolates the interior of the fuel container from the atmosphere when the unit is in storage. Preferably, both ends of the sealing strip are coated with a layer of contact type adhesive in order to hold the strip in place until the unit is ready for use.

As viewed in FIGURE 2, the sealing strip 15 is scored along its long axis and is also provided with three transversely extending score lines. Suitable legends are printed along the score line so that the user will know where the sealing strip is to be folded. When the sealing strip is removed from the fuel container, it is first folded lengthwise along the longitudinally extending score line. The folded piece is then folded again along each of the transverse score lines. One end portion is then fitted over the other so that a tripod stand is formed as is clearly shown in FIGURE 2a.

In use, the sealing strip is removed from the can, and folded as described above to form the tripod stand. The food container is opened and placed on the stand. The fuel within the fuel container is ignited and the food is heated up. Ordinarily, only the amount of fuel required to fully heat the contents is placed in the fuel container thereby eliminating the danger of the food burning. It may be desirable to occasionally stir the contents of the container, however, in order to prevent scorching of the food nearest the bottom of the can.

I have also found that it is preferable to separate the fuel container from the food container by a small air space shown at 16 in FIGURE 3. The provision of this air space results in uniform heat transfer from the fuel container to the food container thereby minimizing scorching of the food.

It may be seen from the foregoing that I have provided an extremely effective self heating food container for use wherever kitchen equipment is not readily available. The arrangement is extremely economical to produce and adds little to the cost of the canned food.

I claim:
1. In combination with a can-like food container, a heating element for cooking the contents of the container in situ comprising: a fuel container for housing a charge of solidified fuel having sidewalls and a substantially flat bottom; means securing said fuel container to the bottom of the food container; a series of ventilating holes in said sidewalls; a removable sealing strip surrounding said sidewalls for covering said holes while said container is in storage; and a series of score lines on said sealing strip along which said strip may be folded to form a tripod stand on which the bottom of the fuel container is adapted to rest, thereby supporting said fuel container during the heating of the contents of the food container.

2. The combination of claim 1, wherein said solidified fuel is methenamine.

3. The combination of claim 2, wherein said food container and said fuel container are cylindrically shaped.

References Cited
UNITED STATES PATENTS

| | | | |
|---|---|---|---|
| 1,173,207 | 2/1916 | Murray | 126—43 |
| 1,325,515 | 12/1919 | Hartmann. | |
| 2,077,703 | 4/1937 | Little. | |
| 2,327,412 | 8/1943 | Fink. | |
| 3,262,445 | 7/1966 | Stults et al. | 126—262 |

CHARLES J. MYHRE, *Primary Examiner.*